Oct. 16, 1951   J. G. WRIGHT ET AL   2,571,984
WORK SUPPORT FOR FASTENER FORMING
AND INSERTING MACHINES
Filed Jan. 18, 1947

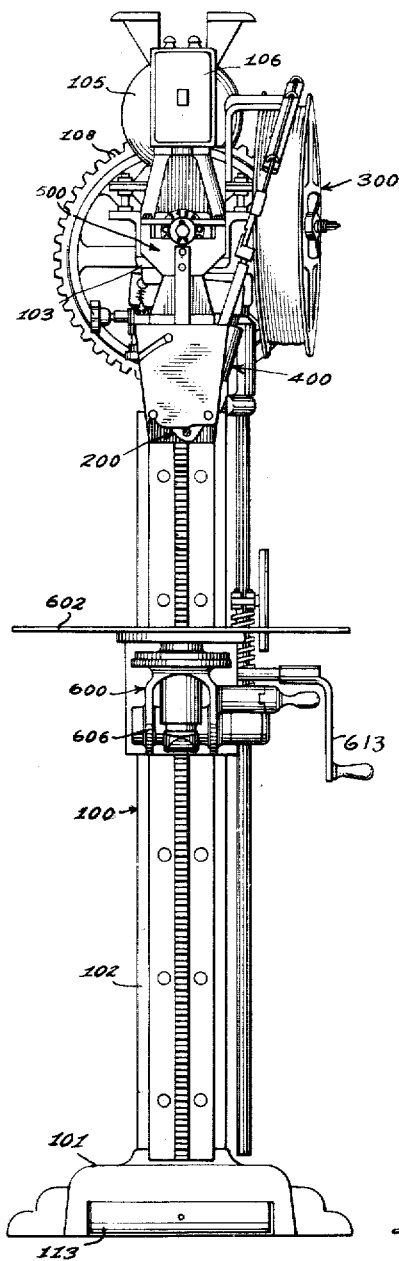
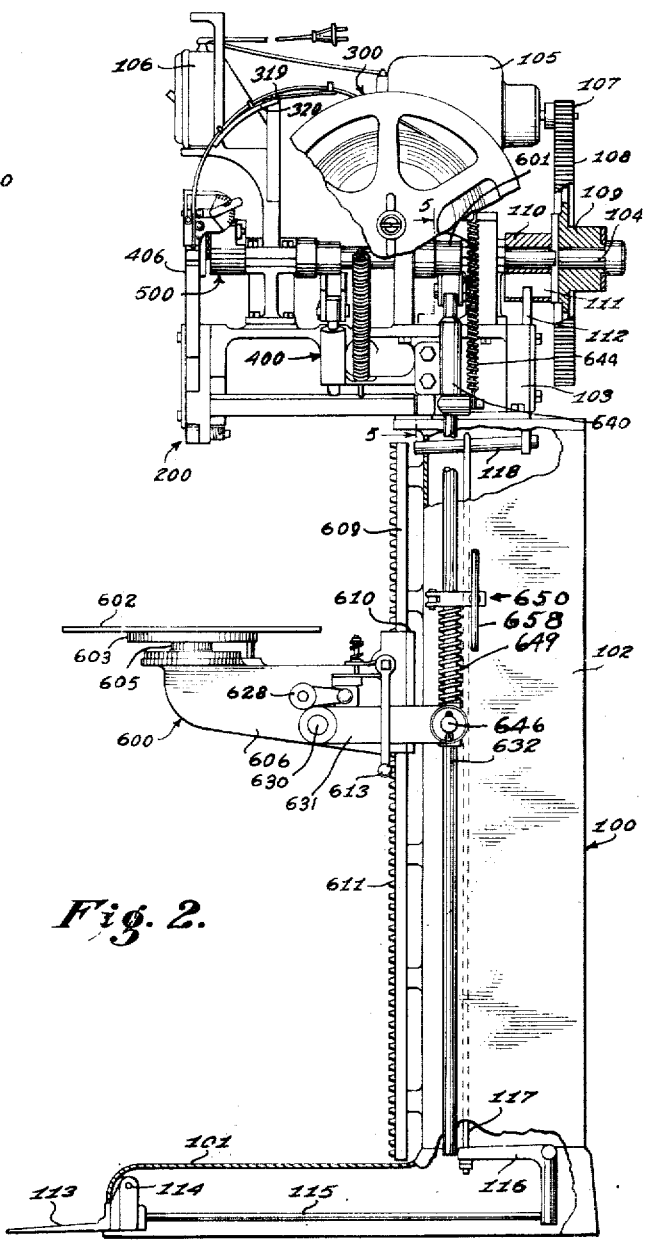

JOHN G. WRIGHT
CHARLES D. TONEY
CHARLES A. WATKINS
EUGENE SUDAN
WILLIAM A. MAXWELL

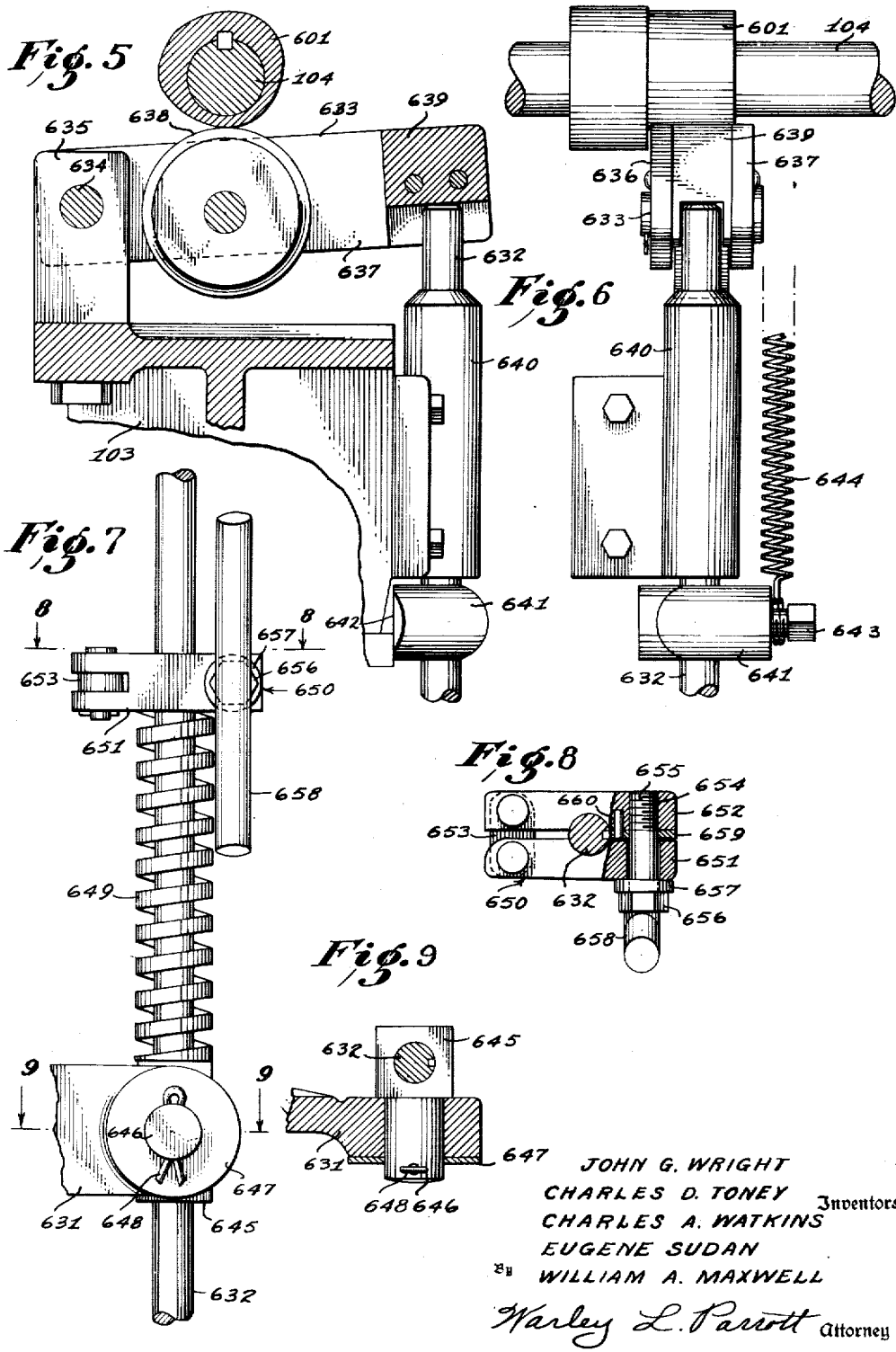

Patented Oct. 16, 1951

2,571,984

UNITED STATES PATENT OFFICE 2,571,984

WORK SUPPORT FOR FASTENER FORMING AND INSERTING MACHINES

John G. Wright, Charles D. Toney, Charles A. Watkins, and Eugene Sudan, Atlanta, and William A. Maxwell, Duluth, Ga., assignors to The Auto-Soler Company, a corporation of Georgia Application January 18, 1947, Serial No. 722,806

5 Claims. (Cl. 1—15)

This invention relates to fastener forming and inserting machines, and more especially to a nailing machine which is adapted particularly for woodworking operations, and by which fasteners are formed from a continuous length of wire or the like and inserted in material to be secured.

In the copending application of Wright et al., Ser. No. 595,776, filed May 25, 1945, and issued as U. S. Letters Patent No. 2,520,521, on August 29, 1950, a machine of the same general type adapted for soling shoes is disclosed. The present invention represents an improvement over the machine disclosed in the above application and incorporates modified and novel features adapting the present machine for heavy duty service in woodworking operations as described more in detail below.

In the drawing:

Fig. 1 is a front elevation of a fastener forming and inserting machine constructed in accordance with the present invention;

Fig. 2 is a corresponding side elevation partly cut away and partly in section;

Fig. 5 is a detail oriented substantially on the line 5—5 in Fig. 2 showing the arrangement for actuating the work support mechanism during fastener forming operations;

Fig. 6 is a corresponding detail in side elevation;

Fig. 7 is a fragmentary detail illustrating the manner in which the actuating elements shown in Fig. 5 are associated with the work support;

Fig. 8 is a sectional detail taken substantially on the line 8—8 of Fig. 7; and, Fig. 9 is a sectional detail taken substantially on the line 9—9 of Fig. 7.

Figure 3:
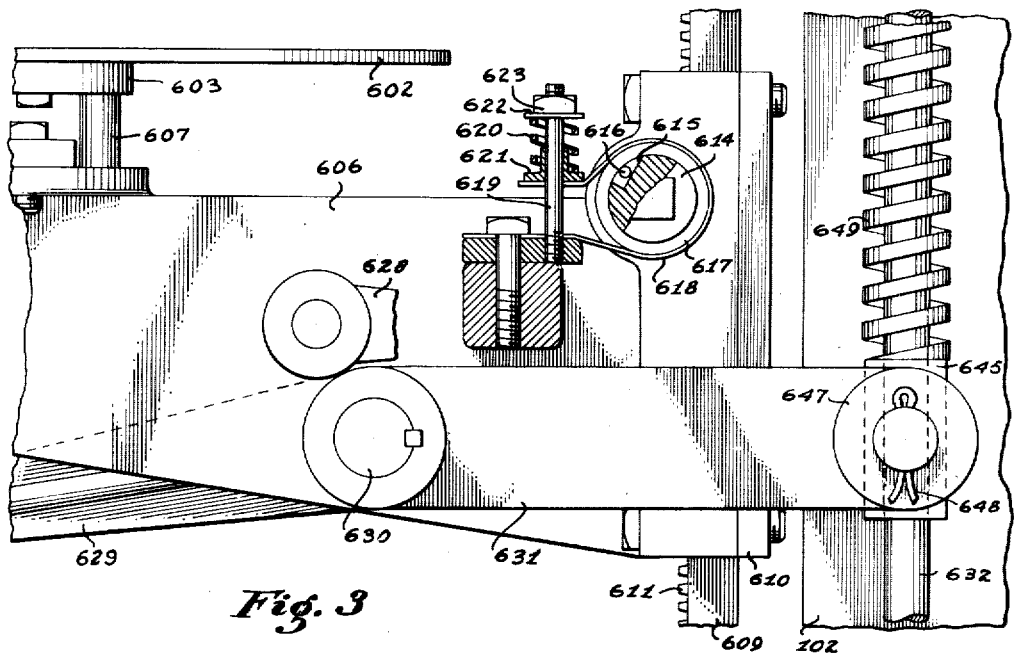
Fig. 3 is a fragmentary detail in side elevation illustrating the arrangement of the work supporting table.

As mentioned above, the present invention is directed particularly to a nailing machine adapted for forming a plurality of fasteners from a continuous length of wire and inserting the fasteners formed in material to be secured. While certain features of the invention may be used in fastener inserting machines generally, and others are of general application otherwise, the invention is shown in the accompanying drawing for purposes of illustration as embodied in a machine of the above type.

Referring first to Figs. 1 and 2 of the drawing, the nailing machine shown comprises generally a suitable frame structure 100 supporting an operating mechanism incorporating means for cyclic actuation of fastener forming and inserting operations in association with a fastener forming knife assembly indicated generally at 200, means for mounting a supply of wire on the machine shown at 300, means 400 for feeding wire from this supply for fastener forming operations, and a fastener inserting plunger mechanism 500.

The frame structure 100 is made up of a base portion 101 adapted to support the machine on a floor or similar surface, a column portion 102 extending vertically from the base portion 101, and an upper frame section 103 mounted at the upper extending end of the column portion 102. The upper frame section 103 is arranged to support an operating shaft 104 in relation to a motor drive unit 105 controlled from a suitable switch box 106. Operating shaft 104 is connected with motor 105 through armature shaft pinion 107 and drive gear 108. The drive gear 108, which is mounted to rotate freely on shaft 104, is formed with a hub portion arranged as a driving clutch member 109. A driven clutch member 110 is fixed on shaft 104 in opposed spaced relation to the driving clutch member 109, and houses a spring pressed clutch pin 111 which is normally held in disengaged position by a clutch bar 112 positioned in engagement with clutch pin 111 by a spring (not shown).

The above described clutch mechanism is operated from a suitable foot pedal 113 mounted in the base portion 101 of frame structure 100. The pedal 113 is pivoted in base portion 101, as at 114, so that when it is depressed a connecting rod 115 is shifted to pivot a bell crank 116 and similarly shift a second connecting rod 117. This second connecting rod 117 is arranged in the column portion 102 of frame structure 100 to extend between bell crank 116 and a lever bar 118 fulcrumed at one end in the column portion 102 and assembled with clutch bar 112 at its other end.

This linkage is accordingly such that depression of pedal 113 causes connecting rod 117 to shift downwardly in column portion 102 and pivot the fulcrumed lever bar 118 to trip clutch bar 112 and thus release clutch pin 111 to engage the driving clutch member 109 so that operating shaft 104 is rotated with drive gear 108 by motor 105. Upon a complete revolution of operating shaft 104, the crank pin 111 is withdrawn from driving clutch member 109 by clutch bar 112 in the usual manner, unless the pedal 113 remains depressed to initiate a succeeding cycle of operation. By this arrangement controlled operation of shaft member 104 is effected for the cyclic actuation of fastener forming and fastener inserting operations.

The fastener forming and inserting machinery of the present invention further comprises a work supporting mechanism 600 for positioning work in the machine. While a work supporting mechanism for a machine of this sort should allow work to be positioned readily in the machine, it must also be arranged to prevent shifting of the work during fastener inserting operations. Such shifting of the work is commonly avoided by providing means for moving the work support in work supporting direction during the fastener inserting operation so that it is gripped between the work support and the operating head of the machine as the fasteners are inserted. The work supporting mechanism 600 of the present invention is arranged for actuation in this manner from a cam element 601 mounted to rotate with operating shaft 104. The action of this cam element 601 is transferred to the work supporting mechanism 600 through a unique connecting linkage adapted to the wide range of adjustment provided for the work support employed in the machine of the present invention, as described further below.

Figure 4:
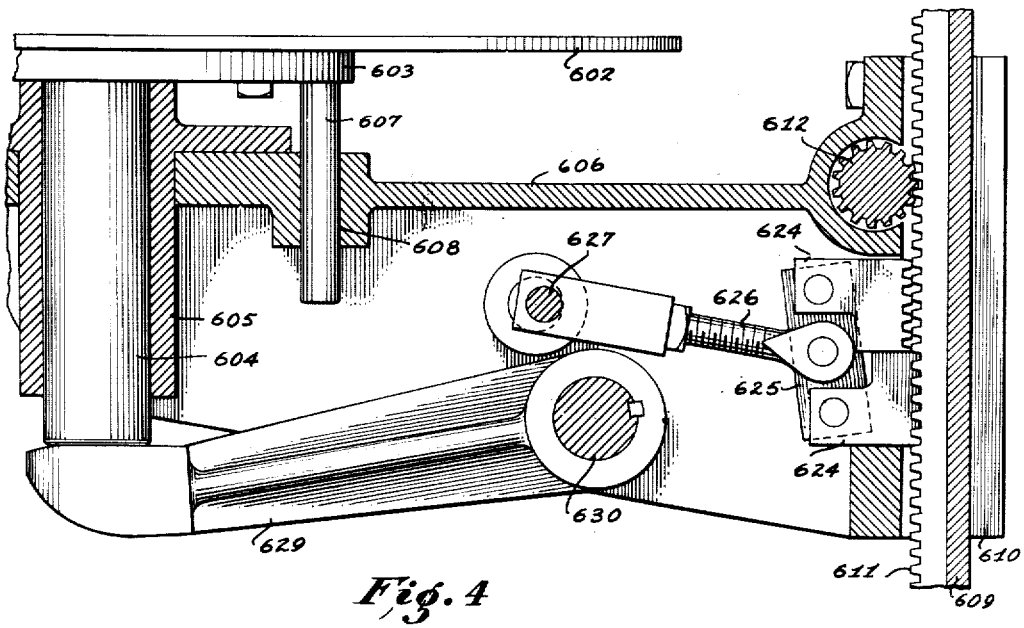
Fig. 4 is a substantially corresponding section showing further details of the work supporting table.

The work supporting mechanism illustrated generally at 600 in Figs. 1 and 2, is shown more in detail in Figs. 3 and 4. The work support proper comprises a table plate 602 secured centrally on a supporting member 603 fitted with a shank 604, which is slidingly received in a bushing 605 carried by an arm structure 606, and a radially spaced positioning dowel 607, which is slidingly received in an aperture 608 formed in arm structure 606 and serves to prevent rotative shifting of table plate 602 about shank 604.

The arm structure 606 is assembled on a vertical guide column 609 (Fig. 3) mounted on the column portion 102 of frame structure 100. This assembly is effected by slide blocks 610 secured on arm structure 606 to provide a sliding association with the vertical guide column 609 and thus allow vertical adjustment of the work supporting mechanism 600. An operating mechanism for obtaining vertical adjustment is provided by a rack 611 (Fig. 4) disposed on the vertical guide column 609 and a pinion 612 disposed for rotation on the arm structure 606 in engagement with rack 611. The pinion 612 is rotated by a crank member 613 (Fig. 1) to raise and lower the arm structure 606 on vertical guide column 609 for vertical adjustment of the work supporting mechanism 600.

In order to counteract the weight of work supporting mechanism 600 during downward adjustment, a cylindrical body member 614 (Fig. 3) is arranged for rotation with pinion 612 on arm structure 606. This cylindrical body member 614 is formed with a longitudinal surface slot 615 having a gradually inclined wall oriented in trailing position with respect to rotation of the cylindrical body 614 and pinion 612 corresponding to lowering of the arm structure 606. A roller member 616 is seated in the slot 615, and an annulus 617 is fitted over the cylindrical body 614 in sliding contact therewith and covering the slot 615 and roller member 616. A brake band 618 is disposed circumferentially over the annulus 617 from a stud member 619 carried on arm structure 606 and fitted with a spring 620 arranged between a sliding flange member 621 and washer 622 for clamping adjustment by a nut 623 to tighten brake band 618 suitably for braking rotation of the annulus 617.

As a result of this arrangement, during rotation of pinion 612, and consequently of the cylindrical body member 614, for lowering the work supporting mechanism 600, braking of annulus 617 by brake band 618 causes roller member 616 to wedge between the annulus 617 and cylindrical body 614 and thus counteract the weight of work support mechanism 600. When work support mechanism 600 is raised, however, the roller member 616 is shifted to the deep portion of slot 615 so that annulus 617 and cylindrical body 614 operate freely in sliding contact even though annulus 617 is braked.

Means for locking the arm structure 606 in adjusted position on vertical column guide 609 is provided by correlated rack segments 624 associated with the arm structure 606. These rack segments 624 are formed with staggered pitches in relation to the rack 611 to provide for engagement in closer correspondence with the adjusted position selected for arm structure 606, and are pivotably mounted for engagement with the rack 611 at the ends of a lever 625 which is in turn pivotably connected at its longitudinal center with arm 626 extending from an eccentric 627 mounted in arm structure 606 and operated by a crank member 628. Crank member 628 may accordingly be manipulated to withdraw the rack segments 624 from rack 611 to allow vertical adjustment of work supporting mechanism 600. When crank member 628 is returned to its locking position after the vertical adjustment is made, eccentric 627 will shift arm 626 so that both of the rack segments 624 on lever 625 will be moved into contact with rack 611. As the rack segments 624 are formed with staggered pitches, however, they can only be engaged selectively with rack 611. The pivoted arrangement of lever 625 allows such selective manipulation of the rack segments 624 so that the mating segment at the adjusted position of arm structure 606 will engage rack 611 to lock the work supporting mechanism in place.

The arm structure 606 also carries a lever structure for shifting the work support in work supporting direction during fastener inserting operations as previously mentioned. This lever structure comprises an arm 629 extending from a pivot shaft 630 journaled in arm structure 606. The arm 629 extends to contact the bottom end of the shank 604 associated with the support 603 for table plate 602 so that it may be actuated to raise shank 604 vertically in the bushing 605 and thus shift table plate 602, and any work supported thereon, in work supporting direction. A second arm 631 extends rearwardly from the pivot shaft 630 for association with an operating rod 632 which is actuated from the previously mentioned cam element 601 mounted on operating shaft 104, as illustrated in Figs. 5 to 9 of the drawing.

Actuation of operating rod 632 (Fig. 2) by cam element 601 (Fig. 6) is effected through a lever element 633 (Fig. 5). The lever element 633 is pivotably supported as at 634 by a hanger block 635 mounted on upper frame structure 103, and comprises two plates 636 and 637 spaced to support a roller 638 in position to follow cam 601 and assembled with a block 639 riding the upper end of operating rod 632. Rotation of cam element 601 with operating shaft 104 will accordingly displace roller 638 to pivot lever element 633 on hanger 635 and depress operating rod 632.

The operating rod 632 is slidingly guided in a sleeve 640 mounted on frame structure 103 as shown in Figs. 5 and 6. Just below sleeve 640 a collar member 641, having a flat surface 642 in sliding contact with frame structure 103 to prevent turning, is secured on operating rod 632 by a set screw 643 from which a spring 644 is extended to a point of attachment (not shown) on frame structure 103 to return operating rod 632 after actuation by cam element 601.

Association of the operating rod 632 with the rearwardly extending arm 631 of the lever structure carried on supporting arm 606 is effected by a bushing block 645 fitted on operating rod 632 and formed with a pin portion 646 adapted for assembly as a pivot with arm 631 by a washer 647 and cotter pin 648 (see Figs. 7 and 9). Downward motion of operating rod 632 upon actuation by cam element 601 is transmitted to arm 631 for shifting the work support in work supporting direction by a spring 649 disposed on operating rod 632 between the bushing block 645 and a clamp mechanism 650.

The clamp mechanism 650 (Fig. 7) comprises a front clamp bar 651 and a rear clamp bar 652 which are pivotably joined by a connecting link 653, each of the clamp bars 651 and 652 being recessed about midway of their length to fit the operating rod 632 as shown in Fig. 8. The rear clamp bar 652 is formed with a threaded bore 654 to receive a screw 655 extended through the front clamp bar 651, and the head 656 of which bears on a washer 657 to draw the clamp bars 651 and 652 together in clamping engagement with operating rod 632. The head 656 of screw 655 is formed with a handle bar 658 so that sufficient purchase may be obtained on screw 655 to secure effective clamping engagement with operating rod 632, and a guide key 659 is fitted over screw 655 between clamp bars 651 and 652 to ride in a slot 660 in operating rod 632 to prevent clamp mechanism 650 from turning on operating rod 632. Clamp mechanism 650 may thus be readily manipulated for adjusting the association of operating rod 632 with arm 631 in correspondence with any desired vertical adjustment of the work supporting mechanism 600.

As noted above, the fastener forming and inserting machine of the present invention is particularly adapted for woodworking operations. And it should be noted that the arrangement of the various operating elements, as described above, is well suited to sturdy construction for heavy duty operations of this sort. Also, the work supporting mechanism used allows easy accommodation of a wide variety of work by the machine, and adapts the machine for operation in a singularly rapid and efficient manner.

We claim:

1. In a fastener forming and inserting machine adapted for forming a plurality of fasteners from a continuous length of wire, the combination with an operating mechanism incorporating means for cyclic actuation of fastener forming and fastener inserting operations, of a work supporting mechanism comprising a work support, an arm structure carrying said work support and assembled with said machine for adjustment to position work in relation to said operating mechanism, a cam element supported on said machine and rotated in accordance with the cyclic actuation of said fastener forming and fastener inserting operations, an operating rod disposed on said machine in association with said arm structure and actuated by said cam element for shifting said work support in said arm structure in work supporting direction during fastener inserting operations, and means for adjusting the association of said operating rod with said arm structure in correspondence with the adjustment of said arm structure and work support on said machine.

2. In a fastener forming and inserting machine adapted for forming a plurality of fasteners from a continuous length of wire and inserting said fasteners in material to be secured, a work supporting mechanism comprising an arm structure on said machine, a work support carried by said arm structure, a lever member fulcrumed on said arm structure for shifting said work support in said arm structure in work supporting direction, a cam element supported on said machine and rotated in accordance with the fastener forming and inserting operations of said machine, an operating rod disposed on said machine in association with said lever member and actuated by said cam element for operating said lever member to shift said work support in work supporting direction during fastener inserting operations, and means for adjusting the association of said operating rod with said lever member in correspondence with the adjustment of said arm structure and work support on said machine.

3. A work supporting mechanism for fastener inserting machines and the like comprising a work support, an arm structure carrying said work support, a rack mounted on said machine, means for assembling said arm structure on said machine in relation to said rack, a pinion disposed on said arm structure to engage said rack for adjusting said arm structure and work support to position work in said machine, and means for locking said arm structure in adjusted position on said machine comprising correlated rack segments associated with said arm structure, said rack segments being formed with staggered pitches in relation to said rack, and means for selective manipulation of said rack segments to engage the segment mating with said rack at the adjusted position of said arm structure.

4. A work supporting mechanism for fastener inserting machines and the like comprising a work support, an arm structure carrying said work support, a vertically disposed rack mounted on said machine, means for assembling said arm structure on said machine in relation to said rack, a pinion disposed for rotation on said arm structure to engage said rack for raising and lowering said arm structure and work support to position work in said machine, and a brake mechanism for counteracting the weight of said arm structure and work support during lowering comprising a cylindrical body disposed for rotation with said pinion and formed with a longitudinal surface slot having a gradually inclined wall oriented in trailing position with respect to rotation of said cylindrical body corresponding to lowering of said arm structure and work support, a roller member seated in said longitudinal slot, an annulus fitted over said cylindrical body in sliding contact therewith and covering said longitudinal recess and roller member, and means for braking rotation of said annulus whereby said roller member is wedged between said annulus and said cylindrical body to transfer braking action from said annulus to said cylindrical body during lowering of said arm structure and work support and said annulus and cylindrical body operate freely in sliding contact during raising of said arm structure and work support.

5. A work supporting mechanism for fastener inserting machines and the like comprising a work support, an arm structure carrying said work support and assembled with said machine for adjustment to position work for fastener inserting operations, a lever member fulcrumed on said arm structure for shifting said work support in said arm structure in work supporting direction, a cam element supported on said machine for rotation during fastener inserting operations, an operating rod disposed on said machine for actuation by said cam element and in association with said lever member for operating said lever member to shift said work support in work supporting direction during fastener inserting operations, and means for adjusting the association of said operating rod and said lever member in correspondence with the adjustment of said arm structure and work support on said machine.

JOHN G. WRIGHT.
CHARLES D. TONEY.
CHARLES A. WATKINS.
EUGENE SUDAN.
WILLIAM A. MAXWELL.

REFERENCES CITED

The following references are of record in the file of this patent:

UNITED STATES PATENTS

| Number | Name | Date |
|---|---|---|
| 84,065 | Locke | Nov. 17, 1868 |
| 96,643 | Wanzer | Nov. 9, 1869 |
| 143,137 | Goddu | Sept. 23, 1873 |
| 171,898 | Wiles | Jan. 4, 1876 |
| 237,925 | Straub | Feb. 15, 1881 |
| 250,404 | Syversen | Dec. 6, 1881 |
| 269,412 | Heaton | Dec. 19, 1882 |
| 376,114 | Smith | Jan. 10, 1888 |
| 380,184 | Celce | Mar. 27, 1888 |
| 382,920 | Westinghouse | May 15, 1888 |
| 500,958 | Severance | July 4, 1893 |
| 659,017 | Cummings | Oct. 2, 1900 |
| 1,091,298 | Dobyne | Mar. 24, 1914 |
| 1,119,510 | Hein | Dec. 1, 1914 |
| 1,139,890 | Metzroth | May 18, 1915 |
| 1,388,846 | Brock | Aug. 30, 1921 |
| 1,462,487 | De Vry | July 24, 1923 |
| 1,581,559 | Williams | Apr. 20, 1926 |
| 1,953,081 | La Chapelle | Apr. 3, 1934 |
| 2,240,429 | Watkins | Apr. 29, 1941 |
| 2,315,382 | Ajouelo | Mar. 30, 1943 |
| 2,417,817 | Finn | Mar. 25, 1947 |
| 2,420,290 | Willhauck | May 13, 1947 |

Certificate of Correction

Patent No. 2,571,984                                October 16, 1951

JOHN G. WRIGHT ET AL.

It is hereby certified that error appears in the printed specification of the above numbered patent requiring correction as follows:

Column 4, line 51, after the numeral "629" insert *(Figs. 3 and 4)*; column 7, line 23, after the word and period "machine." and before the signatures to the specification insert the following claim—

6. A work supporting mechanism for fastener inserting machines and the like comprising a work support, an arm structure carrying said work support and assembled with said machine for adjustment to position work for fastener inserting operations, a lever member fulcrumed on said arm structure for shifting said work support in said arm structure in work supporting direction, a cam element supported on said machine for rotation during fastener inserting operations, an operating rod disposed on said machine for actuation by said cam element and in association with said lever member for operating said lever member to shift said work support in work supporting direction during fastener inserting operations, means for adjusting the association of said operating rod and said lever member in correspondence with the adjustment of said arm structure and work support on said machine, said means comprising a bushing pivotally associated with said lever member and mounted for sliding movement on said operating rod, a spring member disposed over said operating rod for bearing against the face of said bushing that is disposed in opposed relation to the direction of actuation of said operating rod by said cam element, and a manually operable clamping means associated with said operating rod for sliding movement when released to allow adjustment of said work support on said machine and for tightening in fixed clamping relation on said operating rod for positioning said spring member against said bushing at an adjusted position of said work support to transmit the actuation of said operating rod through said spring member to said lever member.

In the heading to the printed specification, line 9, for "5 Claims." read *6 Claims.*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*